US007963774B2

(12) United States Patent
Shiff et al.

(10) Patent No.: US 7,963,774 B2
(45) Date of Patent: Jun. 21, 2011

(54) DEVICE INTERFACES WITH NON-MECHANICAL SECUREMENT MECHANISMS

(75) Inventors: Victor E. Shiff, Woodinville, WA (US); Jonathan D. Friedman, Seattle, WA (US); Christopher C. L. Tham, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/830,562

(22) Filed: Jul. 6, 2010

(65) Prior Publication Data

US 2010/0267250 A1 Oct. 21, 2010

Related U.S. Application Data

(63) Continuation of application No. 11/263,053, filed on Oct. 31, 2005, now Pat. No. 7,775,801.

(60) Provisional application No. 60/642,264, filed on Jan. 5, 2005.

(51) Int. Cl.
*H02R 11/30* (2006.01)

(52) U.S. Cl. ........................................... 439/38; 439/39

(58) Field of Classification Search .................. 439/188, 439/700, 38–40, 500, 923, 929, 824; 235/441, 235/449, 486, 493; 320/115
See application file for complete search history.

(56) References Cited

U.S. PATENT DOCUMENTS

| | | | | |
|---|---|---|---|---|
| 3,521,216 | A * | 7/1970 | Tolegian | 439/39 |
| 3,786,391 | A * | 1/1974 | Mathauser | 439/39 |
| 5,401,175 | A * | 3/1995 | Guimond et al. | 439/38 |
| 5,829,987 | A * | 11/1998 | Fritsch et al. | 439/38 |
| 5,838,138 | A * | 11/1998 | Henty | 320/107 |
| 5,931,683 | A * | 8/1999 | Pinel | 439/39 |
| 6,623,276 | B2 * | 9/2003 | Dalmau Ferrerfabrega et al. | 439/39 |
| 7,775,801 | B2 * | 8/2010 | Shiff et al. | 439/39 |

* cited by examiner

*Primary Examiner* — Michael C Zarroli

(57) ABSTRACT

A number of device interfaces that may use magnetic forces to secure different devices together are disclosed. The device interfaces may include magnetic material positioned in between parallel rows of electrical contact elements in the devices. Magnetic forces may be exerted on and from the electrical contact elements to cause mutually cooperating elements from the devices to be substantially attracted and drawn towards each other. Once the contact elements make contact and are engaged, their mutual attractive forces may cause them to resist being separated. Additionally, the distal ends of the contact elements may have mutually cooperating male and female engagement surface configurations.

18 Claims, 8 Drawing Sheets

DEVICE INTERFACES WITH NON-MECHANICAL SECUREMENT MECHANISMS

CROSS-REFERENCE TO RELATED APPLICATIONS

This application is a continuation of, and incorporates by reference, U.S. patent application Ser. No. 11/263,053, filed Oct. 31, 2005, now U.S. Pat. No. 7,775,801, which claims the benefit of, and incorporates by reference, U.S. Provisional Patent Application Ser. No. 60/642,264, filed Jan. 5, 2005.

TECHNICAL FIELD

The disclosed subject matter relates generally to mechanisms that establish electrical connectivity among coupled devices, and, more particularly, to mechanical arrangements that use magnetic forces for coupling together devices that transfer electrical energy between each other.

BACKGROUND

As society becomes more mobile, the use of wireless or mobile devices is growing rapidly for a number of reasons. For instance, mobile devices are often well suited for providing people with real time information. The advancement of lightweight software operating systems together with the availability of increasingly miniaturized hardware components have led to the development of mobile devices relatively small enough to be worn on or otherwise attached to a person's body.

Mobile devices that can be worn are often designed to resemble more traditionally worn artifacts and to meet a general consumer demand for sleek and otherwise unobtrusive products. The components used to impart the added functionalities provided by wearable mobile devices, however, may often impose a number of design constraints that may impact design considerations related to imitating the traditionally worn artifact features and/or making sleek or unobtrusive products.

SUMMARY

The following section of this patent application document presents a simplified summary of the disclosed subject matter in a straightforward manner for readability purposes only. In particular, this section attempts expressing at least some of the general principles and concepts relating to the disclosed subject matter at a relatively high-level simply to impart a basic understanding upon the reader. Further, this summary does not provide an exhaustive or limiting overview nor identify key and/or critical elements of the disclosed subject matter. As such, this section does not delineate the scope of the ensuing claimed subject matter and therefore the scope should not be limited in any way by this summary.

A number of device interfaces that may be employed by different devices to transfer electronic energy between each other are disclosed. The disclosed device interfaces may comprise a number of electrical contacts (hereinafter referred to as "interface elements" and variations thereof), which may securely engage a number of other mutually cooperating interface elements from other devices to transfer the electrical energy. Further, the device interfaces may use non-mechanical mechanisms, such as magnetic forces, to help with securing the engaged electrical contacts during the electrical energy transfer, for example.

Magnetic material positioned relatively close to the interface elements may exert the magnetic forces onto the respective interface elements. When the distal ends of mutually cooperating interface elements from different devices approach each other, their respective magnetic forces may substantially cause them to be drawn towards each other. Once the interface elements engage each other by making contact, their magnetic forces may cause them to resist being separated from each other. Further, mutually cooperating interface elements from different devices may be magnetized with opposite polarizations. The magnetic material may be arranged in a particular manner within the different devices to achieve a desired magnetic polarization for a number of reasons. For instance, interface elements with the same magnetic polarizations may repel each other to help prevent damaging electrical components in their respective devices.

BRIEF DESCRIPTION OF THE DRAWINGS

The ensuing detailed description section will be more readily appreciated and understood when read in conjunction with the accompanying drawings, wherein.

The same reference numerals and/or other reference designations employed throughout the accompanying drawings are used to identify identical components except as may be provided otherwise.

DETAILED DESCRIPTION

Figure 1:
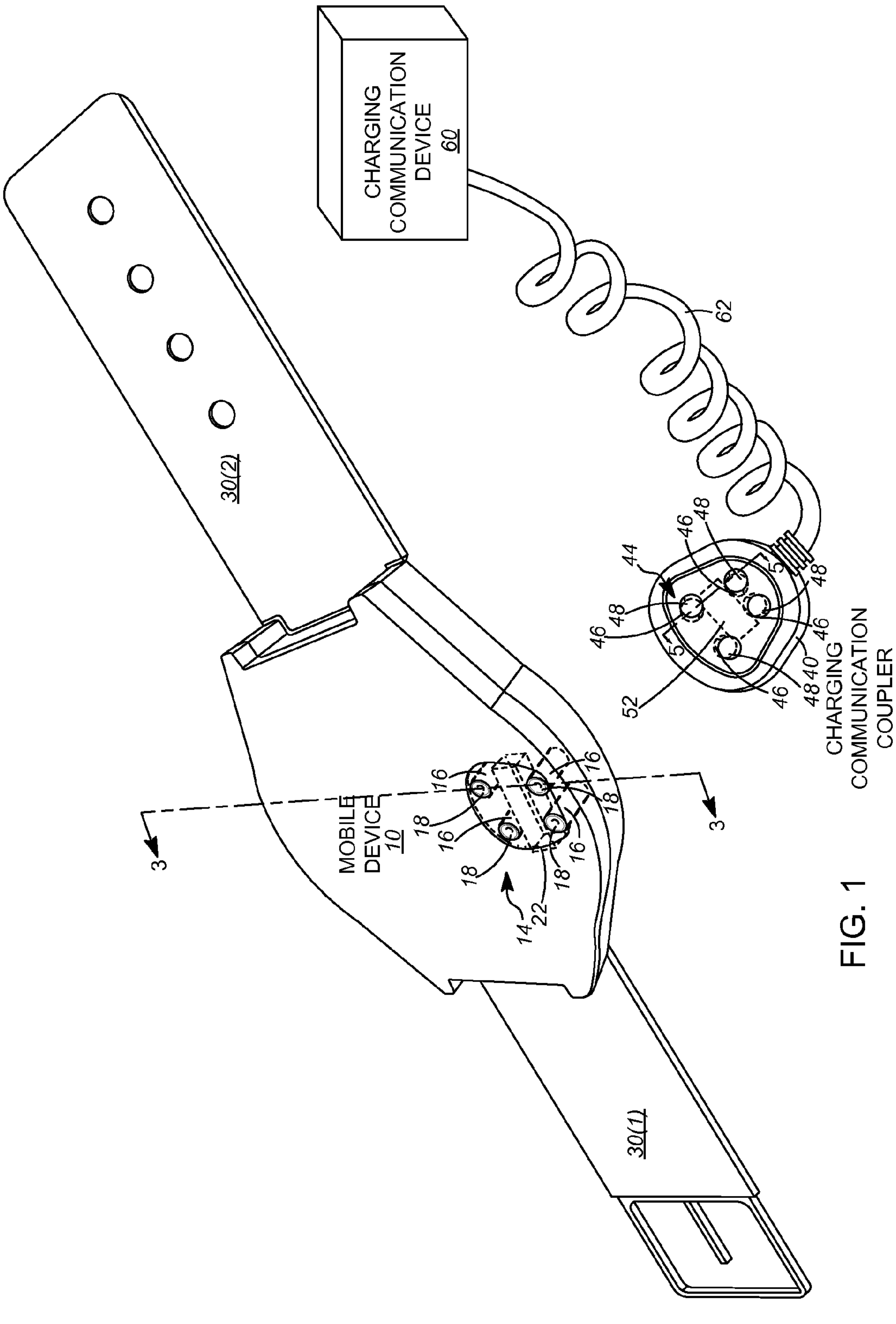
FIG. 1 is an isometric view of a mobile device and a corresponding communication/charging coupler employing interfaces that may be secured to each other using non-mechanical mechanisms.

The accompanying drawings and this detailed description provide exemplary implementations relating to the disclosed subject matter for ease of description and exemplary purposes only, and therefore do not represent the only forms for constructing and/or utilizing one or more components of the disclosed subject matter. Further, while this description sets forth one or more exemplary operations that may be implemented as one or more sequence(s) of steps expressed in one or more flowcharts, the same or equivalent operations and/or sequences of operations may be implemented in other ways.

As mentioned above earlier, components used to impart added functionalities that may be provided by wearable mobile devices may often impose a number of design constraints that may impact design considerations related to imitating the traditionally worn artifact features and/or making sleek or unobtrusive products, for example. For instance, mobile devices with processing components may include functionalities relating to exchanging data with other devices or systems, such as computers.

The mobile devices may have one or more types of communication interfaces (e.g., USB) or other types of interfaces for establishing physical line-based or wireless connections between the mobile devices and the other devices for carrying out their data exchange related functionalities, for example. Despite the availability of increasingly miniaturized hardware components, however, the mechanisms and/or structures forming the communication interfaces may often increase the mobile device's overall size and thwart manufacturer's efforts to meet general consumer demand for sleek and otherwise unobtrusive wearable mobile devices.

A mobile device interface 14 and a corresponding transfer device interface 44 described herein and illustrated in FIGS. 1-7 may form communication interfaces on devices that may employ internal processing components, although the disclosed interfaces 14 and/or 44 may form other types of interfaces, such as charging interfaces for recharging battery supplies in devices, for example. The overall sizes of devices that may employ interfaces 14 and/or 44 may be only slightly larger than the overall sizes of these same devices without the interfaces 14 and/or 44.

By way of example only, some wristwatch devices may employ a number of internal processing components for implementing various functionalities beyond basic time keeping. These internal processing components may be concealed within the wristwatch device's casing, which may have a bottom surface facing and/or resting upon a wristwatch device wearer's wrist when the device is worn by a person. Further, the mobile device interface 14 may be formed on the casing's bottom surface, for example.

The internal processing components may use the mobile device interface 14 formed on the casing's bottom surface to interact with other devices according to the functionalities implemented by the processing components. The overall thickness or depth of the casing, which can be measured from a top surface forming the watch face down to where the mobile device interface 14 may be formed on the casing's bottom surface, may be slightly larger than what the overall thickness of that same casing may be without the mobile device interface 14. However, the substantially slight increase in the wristwatch device casing's comparative thickness that may result from forming a mobile device interface 14 in the manner disclosed herein on the casing's bottom surface may be relatively insignificant.

The relatively slight increase in the casing's thickness may be substantially insignificant or insufficient enough to substantially deprecate a person's comfort when wearing the wristwatch device and/or to substantially diminish the device's aesthetic appearance in many cases, for example. Moreover, a number of configuration options may exist for the wristwatch device in this example that may not otherwise subsist if the interface 14 caused a substantially greater increase in the casing's overall thickness.

The resulting additional configuration options may potentially lead to substantially improving the aesthetic appearance of these types of devices in general, substantially increasing the variety of different looking devices, and/or reducing the overall weight of these devices, for example. As such, a general, high-level description of the mobile device interface 14 and corresponding transfer device interface 44 will now be provided, which will be followed by a more detailed description further herein below.

Figure 3:
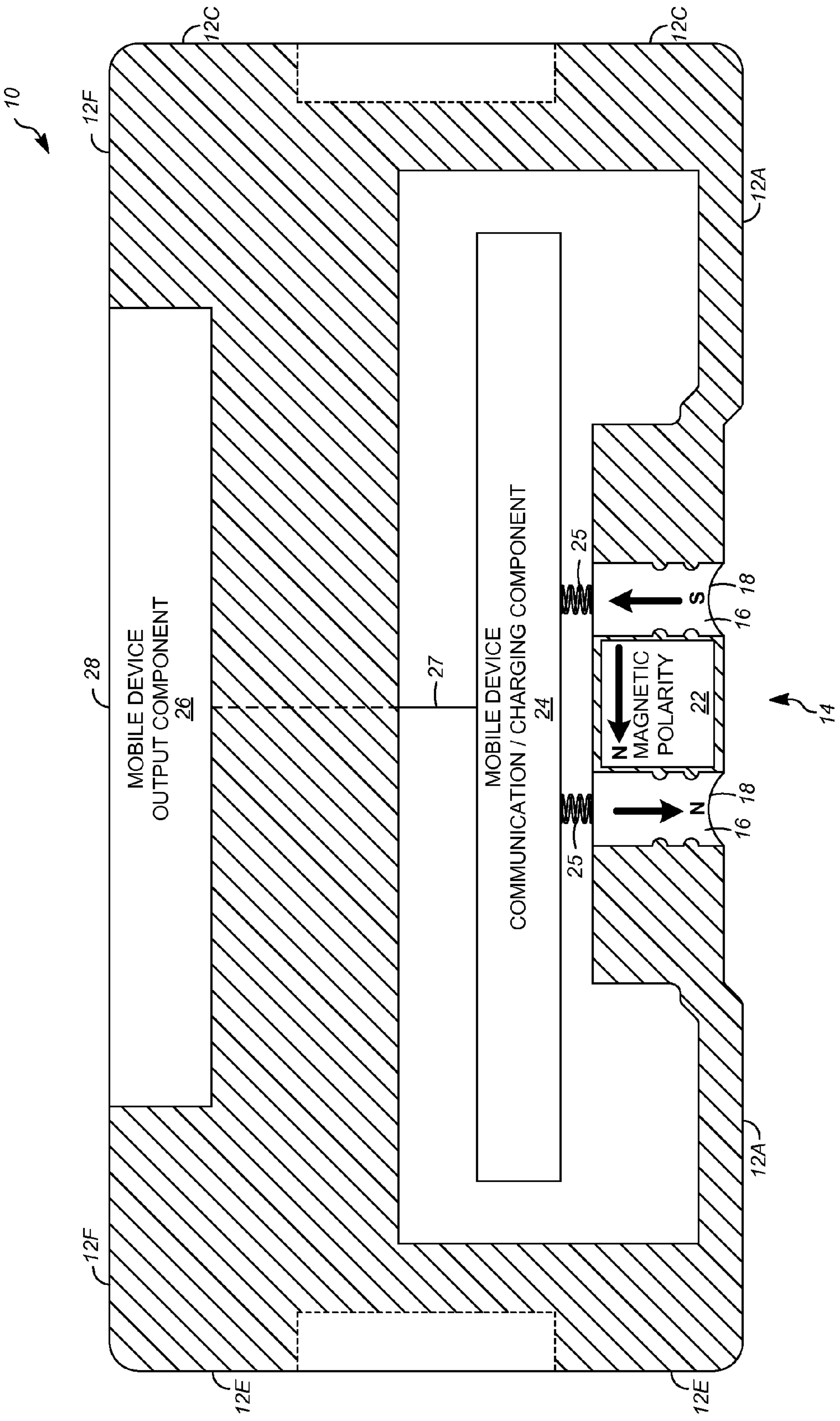
FIG. 3 is a cross sectional view of the mobile device taken along the axis 3-3 illustrated in FIG. 1.
Figure 5:
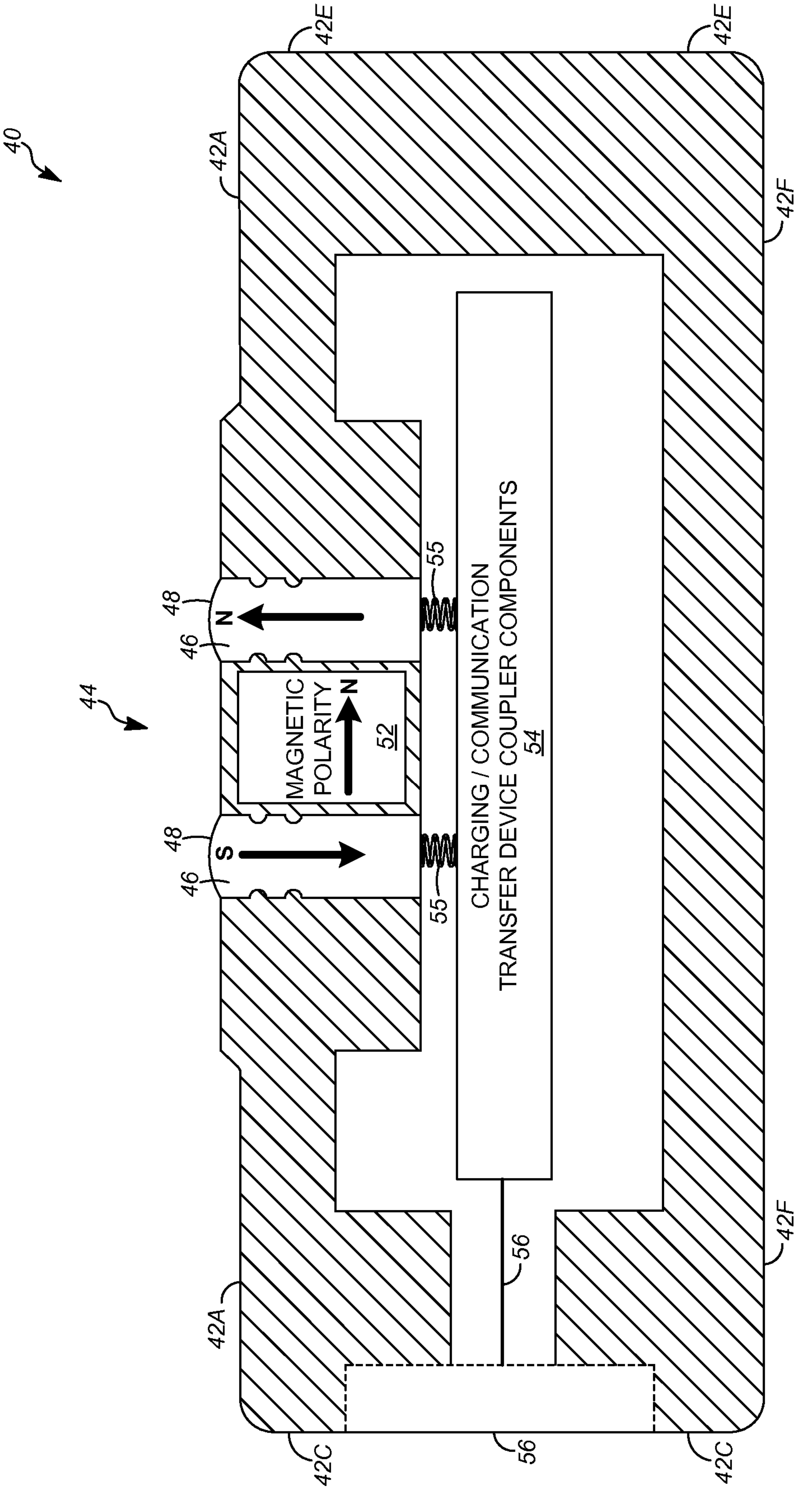
FIG. 5 is a cross sectional view of the communication/charging coupler taken along the axis 5-5 illustrated in FIG. 1.

Referring generally to FIGS. 1, 3 and 5, a mobile device 10 is shown that may engage a charging/communication coupler 40 to permit the transfer of electrical energy involving the charging/communication device 60 using mutually cooperating interface elements 16 and 48 that are magnetized with opposite magnetic polarizations. When the magnetized elements 16 and 46 are drawn and engage each other based on mutually attractive forces, they may conduct electrical energy between the devices 10 and 40 for a number of purposes, such as for transferring data between the devices or for charging one or more of the devices. When the devices 10 and 40 are improperly positioned relative to each other, however, their respective magnetized elements 16 and 46 may repel each other as a result of having the same magnetic polarization.

As will be described in greater detail further herein below, magnets 22 and 52 may be positioned substantially close to and in between rows of elements 16 and 46 arranged in the devices 10 and 40, respectively. Moreover, the magnets are arranged within each device so that they may exert magnetic forces on their respective elements 16, 46 having opposite magnetic polarizations as shown in FIGS. 3 and 5, for instance. Basically, the lines of magnetic energy exerted by each of the magnets 22 and 52, respectively, may be conducted by the rows of elements 16 and 46 surrounding the magnets in such a way that may cause the elements to attract each other when properly mated and repel each other when improperly mated as described in greater detail herein below. The elements' mutually attracting magnetic forces may enable the device 10 and coupler 40 to securely engage each other while minimizing the mobile device's dimensions. It should be appreciated that the devices 10 and 40 are shown in the manner illustrated in FIGS. 1-8 for exemplary purposes only as a variety of other devices and configurations could be used, such as including a magnet in just one of the devices.

By way of example only, the mobile device 10 may comprise a wristwatch having one or more components that may enable the device 10 to receive and/or transmit electrical energy in the form of data encoded in electrical signals, although the device 10 may comprise other types of devices with other components for performing other types of functions, such as obtaining encoded information from radio signals where some of the device's components function as antennas for receiving radio signal transmissions.

Furthermore, one or more other components may enable the device 10 to receive electrical energy in the form of electrical power for recharging one or more battery storage mechanisms in the device 10, for instance. Other examples of a mobile device 10 may include portable computers, personal digital assistants ("PDAs"), cellular telephones, alarm clocks, and the like. Therefore, it should be appreciated that the use of a wristwatch throughout FIGS. 1, 2, 3, 6 and 7 and in portions of the ensuing corresponding description is intended for illustrative and descriptive purposes only.

The charging/communication coupler 40 is depicted in the manner illustrated in FIG. 1, 4, 5, 6, 7 for illustrative and exemplary purposes only, as any number of other shapes and/or configurations could be used. Moreover, while the charging/communication coupler 40 is shown as being coupled to the charging/communication device 60 via a transfer medium 62, the coupler 40 and device 60 could be coupled together using other media, such as via a wireless connection, for example. The transfer medium 62 and the manner it is depicted in the above-referenced figures is provided for illustrative and exemplary purposes only, as any number of other configurations and wire-based or wireless transfer mediums could be used.

The charging/communication device 60 may comprise a number of devices suitable for charging and/or communicating with the mobile device 10. For instance, where the charging/communication device 60 represents a recharging unit, any number of power sources may be used base on the power requirements of the mobile device 10, such AC recharging power adaptors, and/or battery storage power sources, and/or any other power source. Where the charging/communication device 60 represents a communication source, the device 60 may represent one or more personnel computers, PDAs, cellular telephones, memory storage units, and/or any other type of device, including other mobile devices.

Moreover, where the device 60 represents any type of communication source, the charging/communication coupler 40 may be configured appropriately. For instance, the coupler 40 may represent a USB interface that may be implemented using the transfer coupler elements 46, for example, although any other type of different types of communication interfaces may be implemented using coupler 40 and transfer coupler elements 46. More detailed examples describing how the mobile device 10, charging/communication coupler 40 and the charging/communication device 60 may be configured to interact with each other (e.g., electrical power/data transfer) will now be described in greater detail herein below with reference to FIGS. 2-7 for ease of description and exemplary purposes only.

Figure 2:
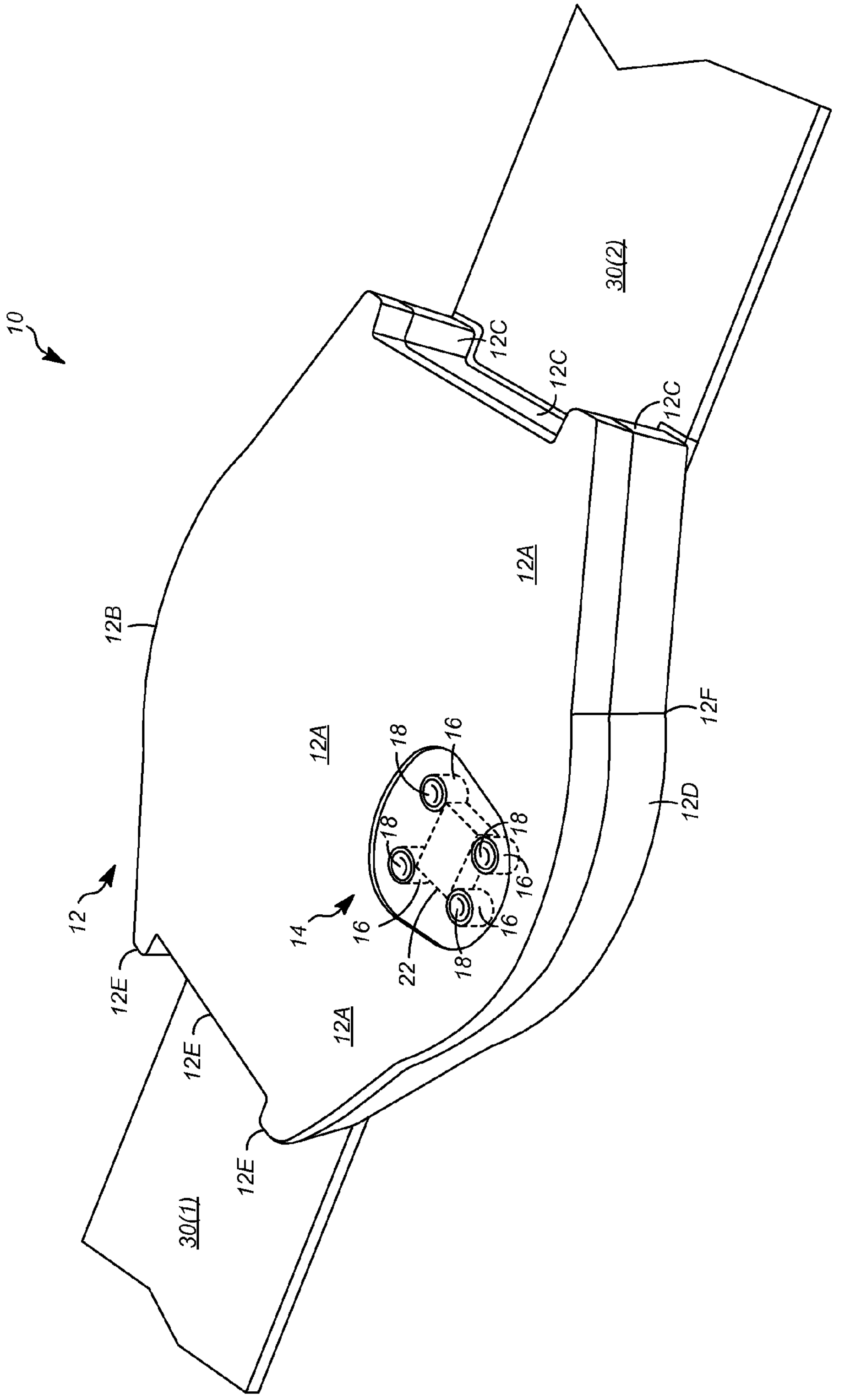
FIG. 2 is a partial perspective bottom view of the mobile device illustrated in FIG. 1 showing a device interface.

Referring now generally to FIGS. 2 and 3, the mobile device 10 will now be described. As mentioned above, the mobile device 10 may engage in the transfer of electrical energy with a charging/communication device 60 through the transfer medium 62. Basically, the mobile device 10 may comprise a device body 12, device interface 14, and/or strap portions 30(1) and 30(2), although the device 10 may comprise other structures and/or other arrangements of these structures.

The device body 12 may include a first device surface 12*a*, which in the example shown in FIGS. 2 and 3 depicts as being a bottom portion of the mobile device 10 that may face and/or make contact with a person's wrist portion of their arm where the device 10 represents a wristwatch type wearable device, for example. Further, second device body surface 12*b*, third device body surface 12*c*, fourth device body surface 12*d*, and/or fifth device body surface 12*e* may enclose one or more internal components of the mobile device 10, as described in greater detail below in connection with FIG. 3. Moreover, the surfaces 12*b*-12*e* may form lateral surfaces when the mobile device 10 is worn on a person's wrist, for example.

Still further, a sixth device body surface 12*f* may face away from the wrist of the person that may be wearing the mobile device 10 as a wristwatch, for instance. In this example, the sixth device body surface 12*f* may represent the top portion of the mobile device 10 when worn on a person's wrist and may be positioned in a parallel orientation with respect to the first device body surface 12*a*, both surfaces 12*a* and 12*f* being spaced apart but connected together by device body surfaces 12*b*-12*e*.

The device body 12 is depicted in FIGS. 2 and 3 as including device body surfaces 12*a*-12*f* for illustrative and exemplary purposes only. Moreover, the sixth device body surface 12*f* is not visible in FIG. 2 because of the orientation of the mobile device 10 in this example, although a reference to the sixth device body surface 12*f* has been included in FIG. 2 to illustrate the approximate orientation of the sixth device body surface 12*f* with respect to the other surfaces 12*a*-12*e* as accurately as possible given the devices' orientation as illustrated.

Further, the device body 12 may be formed of a number of materials, including conductive materials, such as metallic materials, non conductive materials, such as polyurethane, and/or any other type of material. Moreover, the device body 12 may comprise one or more integrated materials forming the device body surfaces 12*a*-12*f*, although the device body 12 may comprise one or more separate structures forming the surfaces and/or combinations of one or more separate and/or integrated structures forming the surfaces 12*a*-12*f*, for instance.

In addition, the device body 12 may be configured and/or may include one or more appropriate structures for flexibly connecting the mobile device 10 with the strap portions 30(1) and 30(2), such as the configuration of the third device body surface 12*c* and the fifth device body surface 12*e* as shown in FIGS. 2 and 3, although the device 10 could be connected to the strap portions 30(1) and 30(2) by any other structures and/or configurations.

As shown in FIG. 2, the device interface 14 may comprise a recessed portion within the first device body surface 12*a*, although the device interface 14 may comprise other configurations, such as being flush with the first device body surface 12*a*, being elevated outwardly away from the first device body surface 12*a* towards the wearer's wrist, or any other configuration. Furthermore, the device interface 14 is shown in FIG. 2 as having a trapezoidal perimeter, although the interface 14 may have any number of other differently shaped perimeters.

As will be explained in further detail below in connection with FIG. 4, for instance, the perimeter of the device interface 14 may be configured to have a particular shape (e.g., trapezoidal) for a number of reasons, including but not limited to enabling the corresponding transfer device coupler interface 44 of the charging/communication transfer device coupler 40 to be secured to the device 10 in a desired orientation, for example. Thus, the optional configuration of the perimeter of the device interface 14 may help ensure a proper or desired orientation of the device 10's interface 14 and the transfer device coupler 40's interface 44. The optional configuration of the perimeter may also provide users with visual cues or guides indicating the appropriate manner for orienting the interfaces 14 and 44 relative to each other when coupling them together.

The device interface 14 may comprise a number of interface elements 16 that may extend out and away from the first device body surface 12*a* towards a person's wrist when the device 10 is worn as a wristwatch, for instance. The interface elements 16 shown in FIG. 2 have been exaggerated for illustrative purposes only. In practice, the interface elements 16 may extend away from the first surface 12*a* of the mobile device 10 by a very small distance (e.g., 0.5 millimeters) to avoid making contact with a wearer's wrist that may otherwise cause discomfort, in addition to minimizing the overall size of the mobile device 10. Further, while the elements 16 are depicted as being cylindrical, the elements may have oval, square, rectangular or other shapes.

The interface elements 16 may comprise steel drill rods with copper plating and/or gold substantially near the distal mating portions, for example, although the elements could be formed of a number of other conductive materials that may be magnetized and/or carry analog and/or digital electrical signals, for instance. Further, where the device interface 14 includes a recessed surface portion as shown in FIG. 3 within the first device body surface 12*a* that is formed of conductive material, the interface elements 16 may be insulated from the conductive portions of the surface 12*a* using a number of insulating materials, such a polyurethane or rubber covering surrounding and insulating the elements 16, or any other type of insulating material. Thus, where the first device body surface 12*a* is formed of a conductive material, insulating the interface elements 16 from the conductive material forming the surface 12*a* may avoid disruption of any magnetic forces and/or electrical signals transferred via the interface elements 16, for instance.

As shown in FIG. 2, the interface elements 16 may include a number of concave distal portions 18 surrounded by a small flat land surface that may facilitate molding the elements, although different numbers and combinations of elements with a number of different surfaces configurations may be used, such as one or more of the elements 16 having convex, concave and/or flat surface configurations. In this example, the concave distal portions 18 may engage one or more mutually cooperating convex distal portions 48 on transfer coupler elements 46 from the charging/communication transfer device coupler 40 shown in FIGS. 4 and 5, for example. Further, the concave distal portions 18 may be formed to be slightly larger than their mutually corresponding convex distal portions 48 to enable the convex portions to enter into the concave portions 18.

Configuring the surfaces of the interface elements 16 and 46 to have mutually cooperating concave and convex distal portions 18 and 48 may help ensure proper alignment and a more positive connection between the mutually cooperating elements 16 and 46, for instance. Further, any debris, moisture or any other undesirable materials that may be present in the recesses formed by the concave distal portions 18 may be displaced by the convex distal portion 48 when they engage each other, for example.

Referring now to FIG. 3, the mobile device 10 may comprise one or more internal components and a device magnet 22. The one or more internal components are provided for illustrative and exemplary purposes only and will be described further herein below. The mobile device magnet 22 may comprise one or more permanent magnets made from Neodymium Iron Boron, although a number of other types of magnets could be used including electromagnets, for instance. Neodymium Iron Boron magnets are a powerful class of rare earth permanent magnets that may enable using a smaller magnet than might otherwise be possible when using less powerful magnets. Further, mobile device magnet 22 may be plated with N36H grade Nickel to resist corrosion if desired. Moreover, the elements 16 themselves could be formed of magnetic material rather than including a separate magnet 22.

The device magnet 22 may be positioned within the device 10 substantially close to and in between substantially parallel rows of interface elements 16 such that the elements 16 themselves may become magnetized, although again, other configurations and/or numbers of elements 16 could be used. Moreover, the magnet 22 may be insulated from the elements 16 and/or one or more of the device surfaces 42 by nonconductive material to prevent short-circuits within the device 10, for instance. Further, a number of device magnets 22 could be used rather than just a single magnet.

This exemplary configuration may help focus or narrow the magnetic fields or forces exerted on and from magnetized elements 16 to prevent magnetic interference with other devices, for instance. Further, the connection between the elements 16 and other elements it may be engaged to, such as the coupler device elements 46, may be enhanced as a result of magnetizing the elements. This may permit employing elements 16 having smaller sizes than might otherwise be possible if the elements 16 were not magnetized. Moreover, the heights of the convex and/or concave surfaces, for instance, may be formed to be substantially small or even flat. As a result, the elements 16 and/or 46 in their respective devices 10 and 40 may be easier to clean, for instance.

In this example, the mobile device magnet 22 is shown in FIG. 3 as having a south to north polarization. As will be described in further detail herein below in connection with FIG. 5, the corresponding transfer device coupler magnet 52 may have an opposite magnetic polarization, such as a north to south polarization, for instance. Positioning the magnet 22 in between the elements 16 may ensure that each of the elements 16 is magnetized with the south to north polarization, for instance.

Magnetizing the elements 16 in the device 10 with magnetic forces having an opposite polarization than the magnetic forces that may be exerted from mutually corresponding coupler interface elements 46 from the charging/communication coupler device 40 may help ensure that the mutually corresponding elements 16, 46 are mutually attracted and drawn towards each other in a proper orientation. Moreover, the magnetized elements may resist being separated once they engaged. Further, elements 16 and 46 with the same magnetic polarizations may repel each other to help prevent the wrong elements from engaging each other and potentially damaging electrical components in either device 10 and/or 40, for instance.

The one or more internal components of the device 10 will now be described for illustrative and exemplary purposes only with continued reference to FIG. 3. Mobile device communication/charging component 24 may comprise one or more mechanisms, such as one or more processing units, one or more communication readable media, and/or any other components. The mobile device communication/charging component 24 may execute one or more machine readable instructions, data structures, program modules and/or other data that may be stored in a machine readable media within component 24, for instance.

Machine readable media may comprise any available media that can be accessed by the processing unit within the mobile device communication/charging component 24. By way of example only, and not limitation, machine readable media may comprise machine storage media and/or communication media, for example. Machine storage media may include volatile and non volatile, removable and non-removable media implemented in any method or technology for storage of information, such as machine readable instructions, data structures, program modules or other data.

Machine storage media may further include, but may not be limited to, RAM, ROM, EEPROM, flash memory and/or other memory technology, CD-ROM, DVD and/or other optical storage, magnetic cassettes, magnetic tape, magnetic disc storage or other magnetic storage devices, or any other medium which may be used to store information in which may be accessed by the one or more processing systems in the mobile device communication/charging 24.

Mobile device communication/charging component 24 may also comprise one or more mechanisms that may enable the mobile device 10 to charge one or more battery storage mechanisms within the component 24 using electrical energy in the form of electrical power provided to the device 10 via the interface elements 16, for instance.

Component/interface element couplers 25 may comprise a number of conductive spring structures as shown in FIG. 3, although other conductive structures besides springs could be used. It should be appreciated, however, that the component/interface element couplers 25 may comprise a number of conductive materials that may couple the mobile device communication charging component 24 with the interface elements 16, such as wires or other types of circuitry, for instance.

Further, the component/interface element couplers 25 may comprise a number of different types of conductive materials, such as materials for enabling electrical energy provided via the element interfaces 16 to the device 10 for charging one or more battery storage devices within the mobile device communication/charging component 24, one or more other types of conductive materials that may enable electrical signals representing data transmitted via the interface elements 16, or any other type of electrical signal, for instance.

Mobile device output component 26 may comprise a number of mechanisms for presenting or outputting the information that may result from the mobile device communication/charging component 24 executing one or more of the machine-readable instructions stored in the machine-readable media within the component 24, for example. The mobile device output component 26 may be coupled to the mobile device communication/charging component 24 via an output/processing component coupler 27, for example. Further, any information that may be presented, such as information visually displayed by the mobile device output component 26, may be visible to a person wearing the mobile device 10 via a transparent portion of the sixth device surface 12*f*, which is depicted in FIG. 3 as a mobile device output medium 28.

The first and second fasteners 30(1) and 30(2) may comprise a number of materials suitable for attaching the mobile device 10 to a wrist portion of a person's arm, such as metallic and/or non-metallic materials, for example. For instance, the first and second fasteners 30(1) and 30(2) may be formed or leather or stainless steel, for example.

Figure 4:
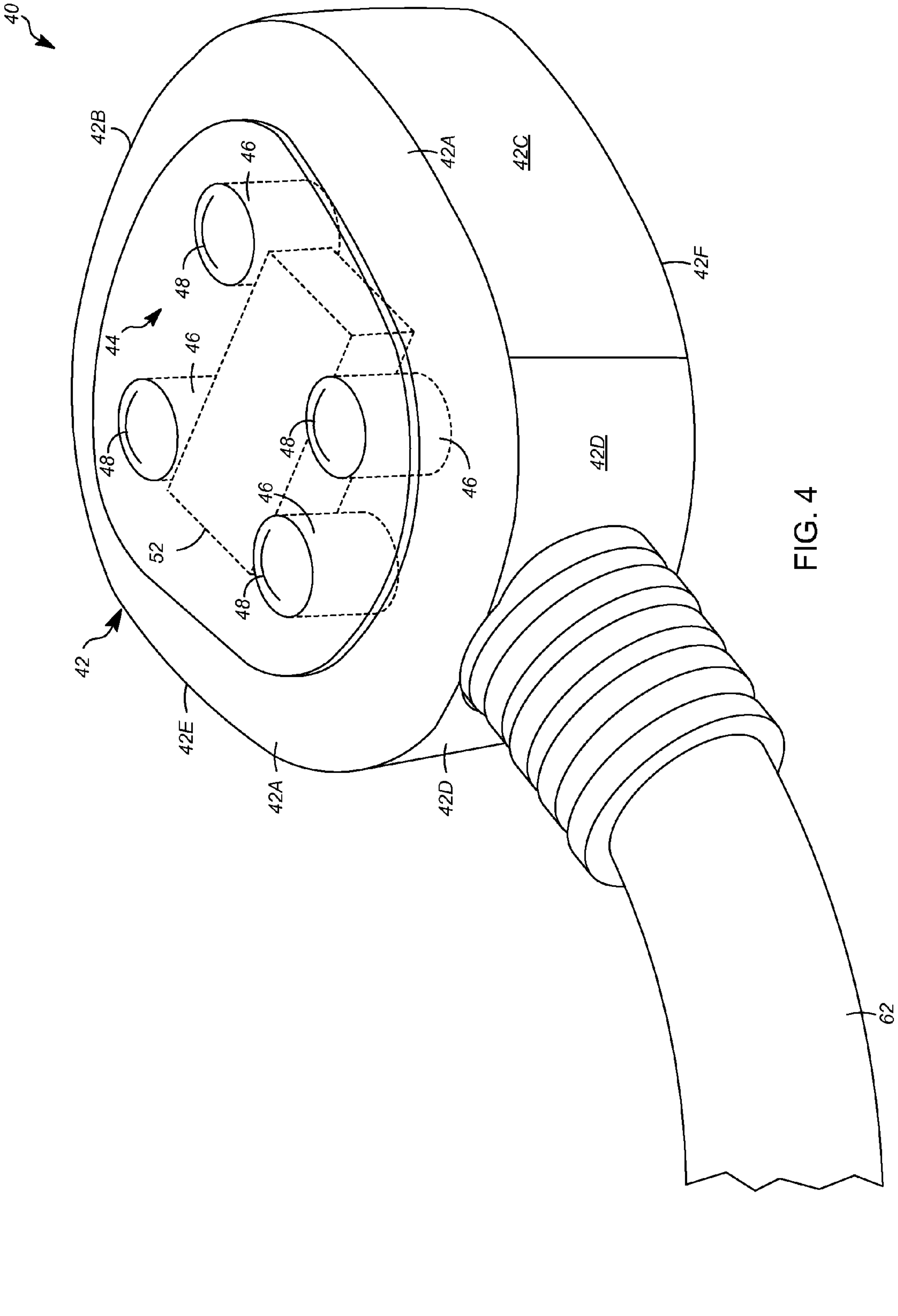
FIG. 4 is a partial perspective bottom view of the communication/charging coupler illustrated in FIG. 1 showing a coupler interface.

Referring now generally to FIGS. 4 and 5, the charging/communication transfer device coupler 40 may comprise a transfer device coupler body 42 and a transfer device coupler interface 44. The transfer device coupler body 42 may comprise first-sixth transfer device coupler surfaces 42*a*-42*f*, for instance. The transfer device coupler surfaces 42*a*-42*f* may comprise one or more separate and/or integrated structures. Additionally, while the sixth transfer device coupler surface 42*f* is identified in FIG. 4, the surface 42*f* is not visible in FIG. 4 in view of the particular orientation of the charging/communication transfer device coupler 40 selected for illustration in FIG. 4.

Still further, the transfer device coupler body 42 may be formed of the same types of materials used to form the mobile device body 12, although the transfer device coupler body 42 may be formed of different materials. For instance, the transfer device coupler body 42 may be formed of a polyurethane material, although again, metallic materials and any other type of material may be used depending on the intended application of the charging/communication transfer device coupler 40, for example.

As shown in FIG. 4, the first transfer device coupler surface 42*a* may comprise a transfer device coupler interface 44, formed on a portion thereof, although the interface 44 could be formed on one or more other surfaces 42*b*-42*f*, for instance. In this example, the transfer device coupler interface 44 may form an elevated surface with respect to the first transfer device coupler surface 42*a*, although the surfaces of the transfer device coupler interface 44 and the first transfer device coupler surface 42*a* may be parallel to each other.

Further, the material used to form the transfer device coupler interface 44 on the surface 42*a* may comprise a number of pliable materials, such as rubber, polyurethane or any other flexible or soft material. More rigid materials may be used to form the first transfer device coupler surface 42*a* surrounding the interface 44 where pliable materials are used to form the interface 44. By making the surface 42*a* more rigid than the interface 44, greater compliance between the mutually cooperating convex and/or concave distal portions 18, 48 on the interface elements 16 and 46 may be ensured when they engage each other.

In this example, the transfer device coupler interface 44 may be configured to correspond to the device interface 14 that may be formed on the first device surface 12*a* in the mobile device 10, for example. Since the device interface 14 may be configured to form a recess portion on the first device surface 12*a* as described above in connection with FIG. 2, a slightly elevated transfer device coupler interface 44 may provide users with a visual cue indicating the proper orientation of the interfaces 14, 44 relative to each other when coupling the mobile device 10 and the charging/communication transfer device. This surface configuration may also help the interfaces 14 and 44 form a more positive connection, for instance.

The transfer coupler elements 46 may extend outwardly and away from the surface of the transfer device coupler interface 44 and/or the first transfer device coupler surface 42*a*, although the elements 46 could be configured in a variety of other manners. As described above in connection with the device interface 14 formed on the first device surface 12*a* of the mobile device 10, the elements 46 may have convex distal portions 48, although again, other arrangements and numbers of concave, convex and/or flat distal portions of the elements could be used. Further, the elements 46 may have other shapes, such as oval, square, rectangular or other shapes.

In this example, the convex distal portions 48 of the transfer coupler elements 46 may be configured to engage the concave distal portions 18 of the interface elements 16, as shown in FIGS. 2 and 4, respectively. As mentioned above earlier, when the mobile device 10 and the charging/communication transfer device coupler 40 engage each other, the mutually attracting magnetic forces exerted from mutually cooperating concave and/or convex distal portions on the interface elements 16 and 46 may help ensure that the transfer device coupler interface 44 and the device interface 14 may be properly oriented and may displace any undesired materials to ensure that data encoded in electrical signals and/or electrical power transferred via the interface elements 16 and the transfer coupler elements 46 are not disrupted, for example.

Referring now specifically to FIG. 5, one or more of the internal components of the charging/communication transfer device coupler 40 are shown for illustrative and exemplary purposes only. As shown in FIG. 5, the charging/communication transfer device coupler 40 may comprise a transfer device coupler magnet 52, which may be positioned within the device coupler 40 substantially close to and in between the transfer coupler elements 46 in the same manner described above in connection with the mobile device magnet 22 and the interface elements 16 illustrated in FIG. 3, although the magnet 52 could be positioned and/or oriented within the charging/communication transfer device coupler 40 in other ways. As a result, the transfer coupler elements 46 may become magnetized, although the elements 46 themselves could be formed of magnetic material rather than including a separate magnet 52.

In contrast to the device interface 14 of the mobile device 10 shown in FIG. 2, the magnet 52 may have a different magnetic polarization than the mobile device magnet 22, for instance. In this example, the transfer device coupler magnet 52 may have a south to north polarity where the north pole of the magnet 52 is positioned closer to the fifth transfer device coupler surface 42*e* than the south pole of the magnet 52. In contrast, the south pole of the magnet 52 may be positioned within the transfer device coupler 40 which may be positioned closer to the third transfer device coupler surface 42*c* than the north pole of the magnet 52, although again, other configurations and magnetic polarizations could be used.

Figure 6:
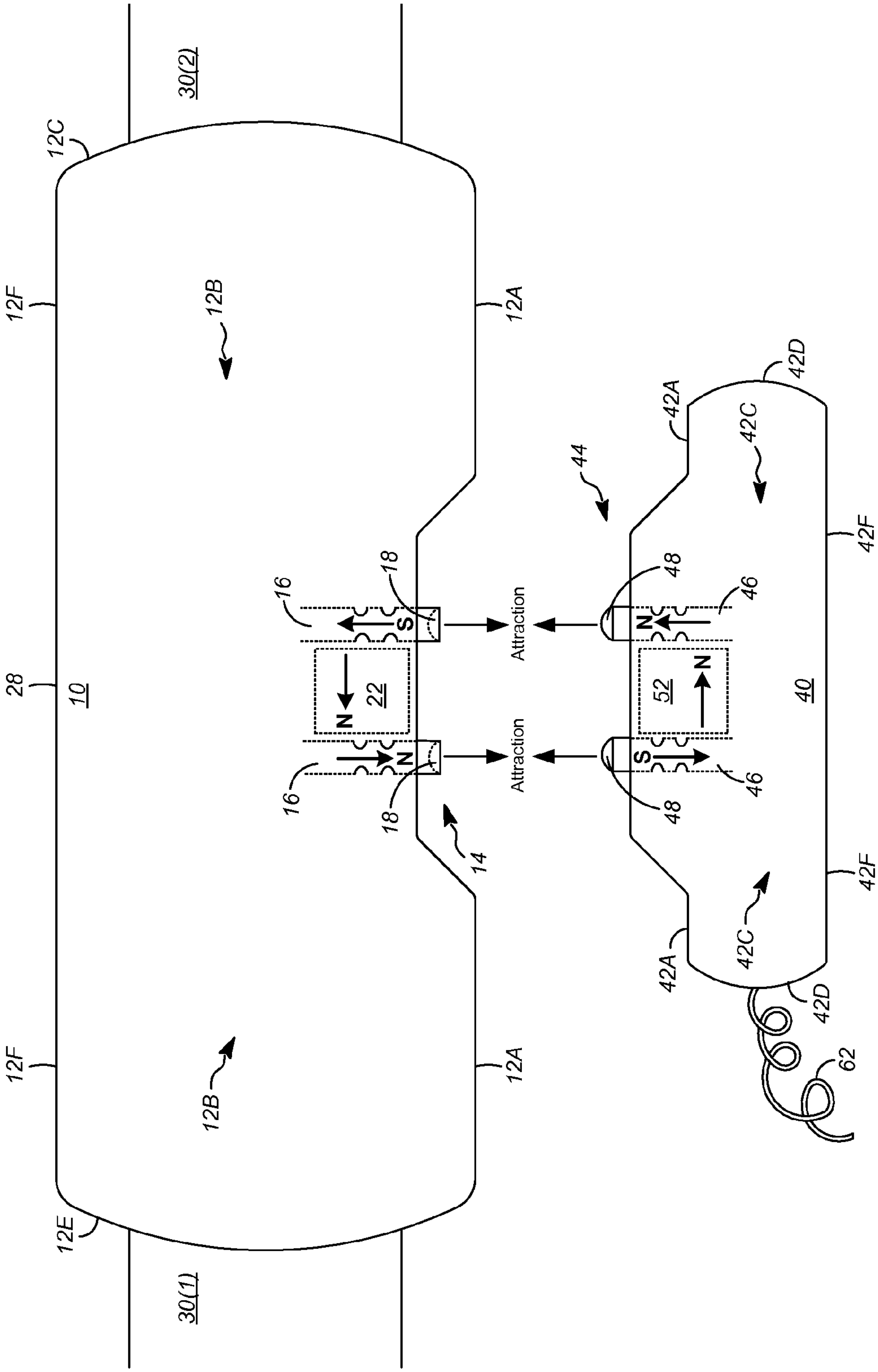
FIGS. 6-8 are partial perspective side and top views of the mobile device and corresponding communication/charging coupler illustrated in FIG. 1 being attracted, repulsed and secured to each other.

The transfer device coupler magnet 52 may apply the particular south to north polarization shown in FIG. 5 for the magnet 52 onto the transfer coupler elements 46. As described above earlier with respect to the mobile device magnet in the device interface 14 of the mobile device 10, the transfer coupler elements 46 may have a different or opposite magnetic polarization than the interface elements 16 shown in FIG. 2, for instance. As a result, the interface elements 16 and the transfer coupler elements 46 may be mutually attracted to each other because of their opposite magnetic polarities. An example of this mutual attraction is illustrated in FIG. 6 described in greater detail further herein below.

Figure 7:
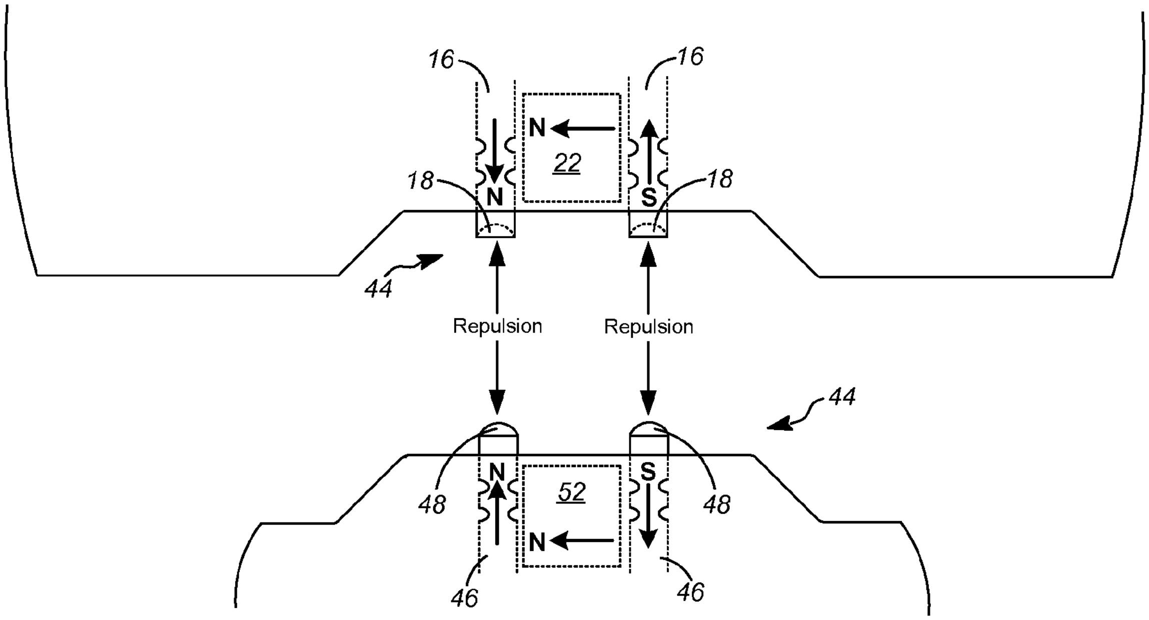

Their mutual magnetic attraction may help draw and secure mutually cooperating elements 16 and 46 together. Moreover, the magnetized elements may resist being separated once they engaged. Further, elements 16 and 46 with the same magnetic polarizations may repel each other to help prevent the wrong elements from engaging each other and potentially damaging electrical components in either device 10 and/or 40, an example of which is also illustrated in FIG. 7 described in greater detail further herein below.

Additionally, the transfer device coupler magnet 52 may be formed of the same types of materials as the mobile device magnet 22 shown in FIG. 2, although the magnet 52 may be made of any other material or one or more combinations of materials, for instance. Moreover, any magnetic material may be used for the magnet 52, as long as the magnetic force exerted on the transfer coupler elements 46 and/or the interface elements 16 may be sufficient to establish a secure engagement. The magnetic polarizations of the magnets 22, 52 and the strength of the magnetic forces applied on the interface elements 16 and/or transfer coupler elements 46 may be configured as desired based on the particular application and/or environment in which the mobile device 10 and/or the charging/communication transfer device coupler 40 and/or the charging/communication source device 60, may be implemented.

As shown in FIG. 5, the charging/communication transfer device coupler 40 may comprise charging/communication transfer coupler components 54, which may be coupled to transfer coupler elements 46 via one or more transfer device element couplers 55, although the device components 54 could be coupled to the elements 46 using other structures, for instance. In particular, the charging/communication transfer device components 54 may comprise one or more mechanisms that may transform and/or process electrical power transferred to the charging/communication transfer device coupler 40 from the charging/communication device 60 via the transfer medium 62 shown in FIG. 1, for instance.

Charging/communication transfer device components 54 may also comprise one or more mechanisms that may convert and/or process electrical energy in the form of data encoded in electrical signals transferred to the charging/communication transfer device coupler 40 from the charging/communication device 60 via the transfer medium 62, for instance. The charging/communication transfer device coupler components 54 may transform, convert and/or otherwise process the data encoded in the electrical signals and/or the electrical power transferred to the transfer device coupler 40 from the transfer medium 62 in a particular manner that may enable the data and/or electrical power to be transferred to the transfer coupler elements 46 via the transfer device element couplers 55 in a particular format that when received by the mobile device 10 via the interface elements 16 and the device 10's device interface 14 for processing in the manner the mobile device 10 may be configured to operate.

For example, the charging/communication transfer device coupler components 54 may comprise one or more mechanisms that may transform data encoded in the electrical signals into a USB format, although the transfer device coupler components 54 may also comprise one or more mechanisms in addition to, or in place of the encoded data transformation mechanisms, which may transform electrical power into a format suitable for transfer over the transfer coupler elements 46 and the interface elements 16 for charging one or more battery storage mechanisms in the mobile device 10 for instance.

The transfer device/medium interface 56 shown in FIG. 5 depicts a portion of the third transfer device coupler surface 42*c* on the charging/communication transfer device coupler 40 where the transfer medium 62 shown in FIG. 1 may be coupled. Moreover, the transfer device/medium interface 56 may comprise one or more structures and/or mechanisms for establishing an electrical power transfer connection and/or a data communication connection with the charging/communication transfer device components 54 via a transfer device coupler components/medium interface link 57, for example.

The transfer device coupler component/medium interface link 57 may represent one or more communication links, such as conductive materials including wires and/or circuitry, although other communication links could be established, such as wireless links. Moreover, the transfer device coupler component/medium interface link 57 may comprise one or more mechanisms depending on whether electrical signals carrying data are being transferred between the transfer device/medium interface 56 and the transfer device components 54, and/or whether the interface link transfers electrical power transferred from the charging/communication device 60 for charging one or more battery storage mechanisms in the mobile device 10, for instance, although the link 57 may comprise one or more combinations of these mechanisms for transferring electrical power or data encoded in electrical signals.

Figure 8:
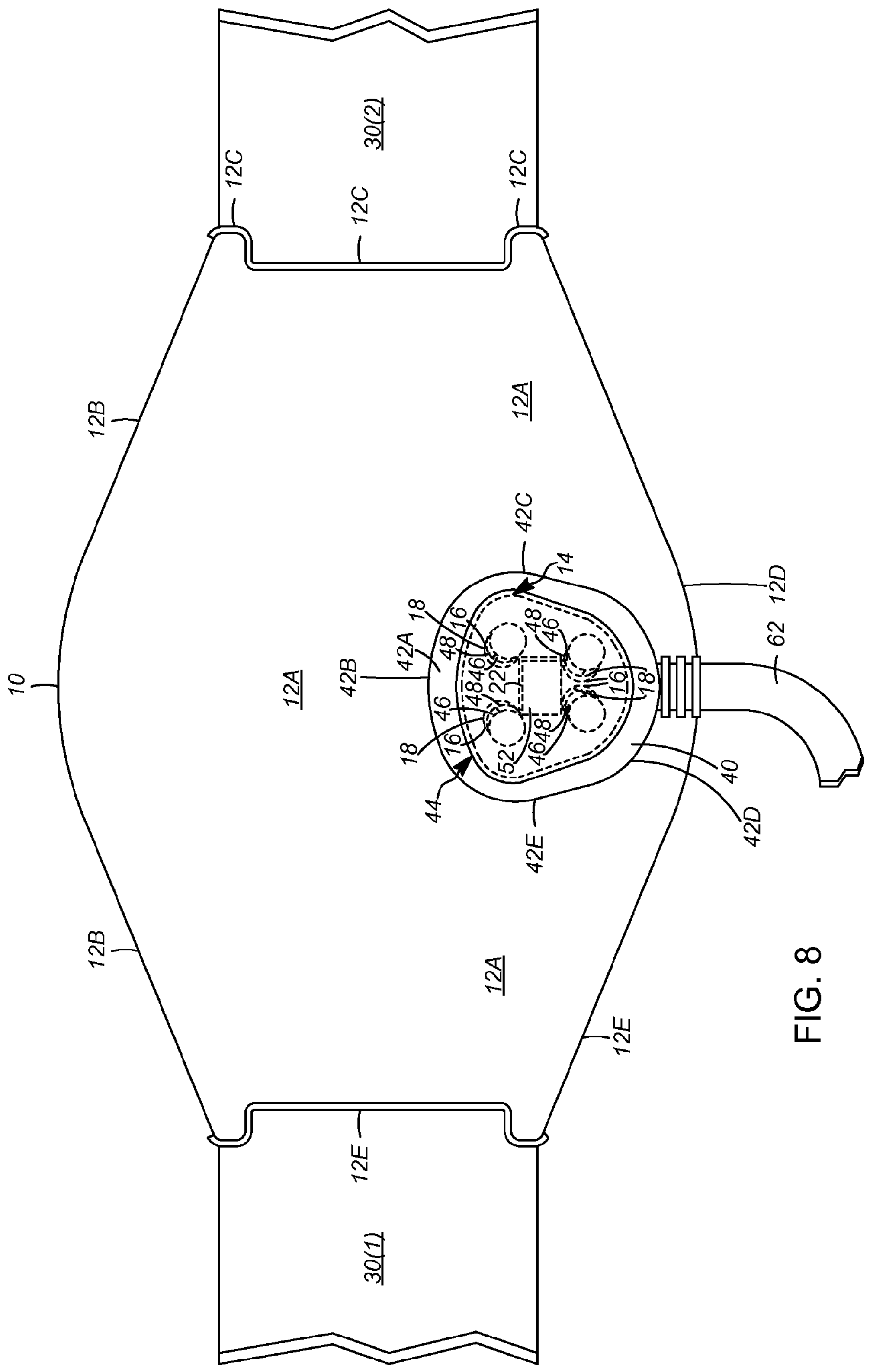

Referring now to FIGS. 6-8, an example of how the mobile device 10 may be interfaced with the charging/communication transfer device coupler 40 to enable data encoded in electrical signals or electrical power to be transferred between the mobile device 10 and the charging/communication device 60 shown in FIG. 1, for instance. By way of example only, a person wearing the mobile device 10 may desire recharging one or more battery storage mechanisms in the mobile device 10, which may be use for providing power to the internal components of the device 10 to enable it to perform the functions represented by machine readable instructions stored in a machine readable medium, for instance. Alternatively, or in addition, and again by way of example only, the person wearing the mobile device 10 may desire transferring data encoded in electrical signals between the mobile device 10 and the charging/communication device 60 shown in FIG. 1.

For instance, the charging/communication device 60 may represent a desktop computer and the data desired to be transferred by the person wearing the mobile device 10 may represent the person's calendar and/or appointment information stored on the device 60, for instance, although the data may represent other things. Moreover, where the person desires transferring electrical power between the mobile device 10 and the charging/communication device 60, the device 60 may represent a power source, such as a standard AC current obtained from a conventional power outlet in a wall, for instance, although the device 60 could represent other power sources, such as, battery storage power sources or the power may be in other formats, such as DC.

Thus, the user may remove the mobile device 10 from their wrist by disengaging one or more mechanisms and/or structures of the strap portions 30(1), 30(2) shown in FIG. 1, for instance, although the mobile device 10 may be removed in other ways and/or the device 10 may not necessarily need to be removed in every case. However, in this example when the mobile device 10 is removed from the person's wrist, the charging/communication transfer device coupler 40 may be set on a substantially planar or flat surface, such as a tabletop, for example. In particular, the fourth transfer device coupler surface 42*d* of the charging/communication transfer device coupler 40 may rest upon the surface, although other surfaces of the coupler 40 may rest upon another surface, and/or the sixth device surface 12*f* of the mobile device 10 may be set upon the planar or flat surface.

The mobile device 10 may then be placed or positioned substantially over and above the transfer device coupler interface 44 formed on the first transfer device coupler surface 42*a* of the charging/communication transfer coupler 40. In particular, the device interface 14 of the mobile device 10 may be oriented with respect to the transfer device coupler interface 44 on the charging/communication transfer device coupler 40 to align recessed configuration formed by the device interface 14 on the first device surface 12*a* with the corresponding elevated configuration formed by the transfer device coupler interface 44 on the first transfer device coupler surface 42*a* to enable the interfaces 14 and 44 to engage.

As the mobile device 10 is positioned and/or oriented to move downward closer towards the charging/communication transfer device coupler 40, the exemplary trapezoidal configuration of the interfaces 14 and 44 shown in FIGS. 2 and 4 may prevent the interfaces 14, 44 from engaging until they are substantially aligned relative to each other. The mobile device 10 and/or the charging/communication transfer device coupler 40 may be positioned and/or oriented until the interfaces 14 and 44 may visually appear to be substantially aligned based on the shapes of the interfaces 14, 33, for instance.

Additionally, the mutually attractive magnetic forces exerted from the interface elements 16 of the mobile device 10 and the transfer coupler elements 46 of the transfer device coupler 40 may begin causing the elements 16 and 46 to attract and draw each other closer, as shown in FIG. 6. The concave distal portions 18 on the interface elements 16 and the mutually cooperating convex distal portions 48 on the coupler elements 46 in this example may eventually engage each other. Any undesirable materials that may be present in the recesses formed by the concave distal portions 18 may be displaced by the mutually cooperating convex distal portions 48 entering inside the recesses.

Further, one or more portions of the slightly elevated transfer device coupler interface 44 in this example may flex in response to any dimensional variations that may exist among the concave distal portions 18 and/or the convex distal portions 48. Once mutually cooperating interface elements 16 and the transfer coupler elements 46 are engaged, their mutual magnetic attraction may cause them to resist being separated from each other, for instance. If the elements 16 and 46 are misaligned but still drawn closer to each other, they may repel each other since their magnetic forces may have substantially the same magnetic polarizations, for instance, as shown in FIG. 7.

The charging/communication device 60 and/or the charging/communication transfer device coupler components 54 and the charging/communication transfer device coupler 40 may begin operating to transfer electrical energy through engaged elements 16 and 46. The electrical energy may be transferred over the transfer medium 62 in the form of data encoded in electrical signals and/or electrical power from the device 60 for further processing and/or use by the mobile device 10, for instance.

The operation of the charging/communication device 60 and/or the charging/communication coupler 40 may be initiated by one or more components in the coupler 40 and/or the device 60 detecting the secure interfacing between the mobile device 10 and the transfer device coupler 40, for instance, although the operation of device 60 and/or the coupler 40 may be initiated in response to any other events, such as a user issuing a request from the device 60 where the device represents a desktop computer, for instance.

The electrical energy may travel in the transfer medium 62 into the transfer device/medium interface 56 on the third transfer device coupler surface 42*c* of the charging/communication transfer device coupler 40, as shown in FIG. 5, for instance. The charging/communication transfer device coupler components 54 may then process and/or transform the data and/or the electrical power in a manner suitable to enable the electrical power and/or data to be transmitted over the transfer device element couplers 55 to the transfer coupler elements 46, as shown in FIG. 5, for instance.

The electrical power and/or the data may enter the mobile device 10 through the interface elements 16, for instance. Referring back to FIG. 3, the data and/or the electrical power may be received by the mobile device communication/charging component 24 through the component/interface element couplers 25, for example. The mobile device communication/charging component 24 may then convert and/or process the electrical power and/or data according to the machine readable instructions stored in a memory within the component 24, which may be executed by one or more processor mechanisms, for instance.

As the data and/or electrical power are processed and/or transformed by the mobile device communication/charging component 24, information may be sent to the mobile device output component 26 via the output/processing component coupler 27. For instance, where the mobile device communication/charging component 24 may transform electrical power received via the component/interface element couplers 25, the component 24 may transform the electrical power into an electrical charging current that may be stored in the mobile device output component 26 where the component may represent a battery storage mechanism, for instance.

Alternatively, where data is received by the mobile device communication/charging component 24 via the component/interface element coupler 25, the component may process the data into processed information that may be sent to the mobile device output component 26 and presented to a user via the mobile device output medium 28, for example. In that scenario, the user may interact with one or more additional mechanisms in the mobile device output component 26 for responding to the information presented at the mobile device output medium 28, for instance.

When the transfer of the electrical power and/or the data is substantially complete, the mobile device 10 and the charging/communication transfer device coupler 40 may be separated from each other by simply pulling apart one or more of the device 10 and/or device coupler 40 using sufficient force to overcome the mutually attractive magnetic forces being exerted by the interface elements 16 and the transfer coupler elements 46 on each other, for instance.

While particular examples and possible implementations have been called out above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed process to any order except as may be specified in the claims.

What is claimed is:

1. A device and a connector, comprising:

a body of the device with an outer surface, the body having a recessed portion of the outer surface;

a magnet arranged within the body, first and second electrical contacts passing through corresponding openings in the outer surface at the recessed portion, the first electrical contact having a first contact surface recessed into the body relative to the outer surface, and the second electrical contact having a second contact surface recessed into the body relative to the outer surface;

the connector comprising third and fourth electrical contacts protruding from a surface of the connector; and wherein when the connector is mated with the recessed portion: the connector fits into the recessed portion and magnet attraction of the magnet to the connector provides connective force between the connector and the device, the first and third electrical contacts contact each other, and the second and fourth electrical contacts contact each other.

2. A device and connector according to claim 1, wherein the connector and the recessed portion have matching keyed shapes that allow mating of the recessed portion and the connector with only one alignment of the connector relative to the recessed portion.

3. A device and connector according to claim 1, wherein the third and fourth electrical contacts have a concave or convex shaped electrical contact surface, wherein when the connector is mated with the recessed portion two convex shaped electrical contact surfaces contact two concave electrical contact surfaces, respectively.

4. A device and connector according to claim 1, wherein the first and second electrical contacts are fixed relative to the device.

5. A device and connector according to claim 1, wherein the third and fourth electrical contacts comprise respective pins that are fixed relative to the connector.

6. A device and connector according to claim 5, wherein the first and second electrical contacts are fixed relative to the device.

7. A device and connector according to claim 1, wherein the device comprises a battery and a battery within the device is charged with power received through the contacting first and third electrical contacts and through the contacting second and fourth electrical contacts.

8. A computing device comprising:

a processor, memory, a rechargeable battery, and a first body;

a first electrical connector comprising:

a recess in the first body, two electrical contacts within the recess, each having a concave contact surface; and a magnet arranged within the body and providing a magnetic field within the recess.

9. A computing device according to claim 8, further comprising:

a second electrical connector, comprising:

a plug comprising a second body and a face having two openings, each opening containing a contact pin, each contact pin having a convex contact surface;

magnetically attractable material;

a cable connected to the plug; and two conductive paths through the body and cable, each conductive path including a respective one of the contact pins.

10. A computing device according to claim 9, wherein the first electrical connector and the second electrical connector are configured such that if the first electrical connector is mated with the second electrical connector:

the convex surfaces of the contact pins contact the concave surfaces of the electrical contacts, respectively;

a portion of the body of the plug fits within the recess of the computing device; and the second electrical connector is held mated with the first electrical connector by magnetic pull of the magnet on the magnetically attractable material.

11. A computing device according to claim 9, wherein the two electrical contacts are immobile relative to the computing device.

12. A computing device according to claim 9, wherein the electrical paths carry data to and from the computing device or carry current to the computing that charges the battery.

13. A computing device according to claim 9, wherein each conductive path includes a spring controlling movement of a corresponding one of the contact pins.

14. An apparatus, comprising:

a first electrical connector that is part of a connector cable and a second electrical connector that is part of a computing device, the first electrical connector and second electrical connector connecting the connector cable with the device;

the first electrical connector comprising:

a body including a protruding portion and a first surface;

a first electrical contact and a second electrical contact within the first surface; and magnetically attractable material; and the second electrical connector comprising a third electrical contact and a fourth electrical contact;

wherein when the first connector is connected to the second connector: the first electrical contact contacts the third electrical contact, the second electrical contact contacts the fourth electrical contact, and magnetic pull of a magnet on the magnetically attractable material causes the first connector to stay connected to the second connector, wherein the protruding portion comprises a plug portion, the second electrical connector comprises a recess or opening in a body of the computing device, and the plug fits the recess when the first electrical connector is connected to the second electrical connector.

15. An apparatus according to claim 14, wherein the first electrical connector comprises a first pin moveable within the body, and the second electrical connector comprises a second pin moveable within the body.

16. An apparatus according to claim 15, wherein a first spring in the body controls movement of the first pin, and a second spring in the body controls movement of the second pin.

17. An apparatus according to claim 14, wherein the third electrical contact and the fourth electrical contact are moveable relative to the second electrical connector.

18. An apparatus according to claim 14, wherein the first and second electrical contacts each comprise a convex shaped electrical contact surface, wherein the recess or opening has a second surface that faces the first surface when the first connector is connected to the second electrical connector, and the third contact and the fourth contact each have a concave shaped electrical contact surface, wherein when the first electrical connector is connected with the second electrical connector the convex shaped electrical contact surfaces contact the concave shaped electrical contact surfaces, respectively.

* * * * *